(12) United States Patent
Campos, II et al.

(10) Patent No.: US 11,116,284 B2
(45) Date of Patent: Sep. 14, 2021

(54) ARTICLE WITH AUXETIC SPACES AND METHOD OF MANUFACTURING

(71) Applicant: NIKE, Inc., Beaverton, OR (US)

(72) Inventors: Fidencio Campos, II, Dallas, OR (US); Christopher D. Czech, Beaverton, OR (US); Zachary M. Elder, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 119 days.

(21) Appl. No.: 16/419,236

(22) Filed: May 22, 2019

(65) Prior Publication Data

US 2019/0365031 A1 Dec. 5, 2019

Related U.S. Application Data

(60) Provisional application No. 62/678,785, filed on May 31, 2018.

(51) Int. Cl.
| | | |
|---|---|---|
| A43B 13/18 | (2006.01) | |
| A43B 13/14 | (2006.01) | |
| A43B 13/20 | (2006.01) | |
| A43B 13/12 | (2006.01) | |

(52) U.S. Cl.
CPC .......... *A43B 13/181* (2013.01); *A43B 13/141* (2013.01); *A43B 13/187* (2013.01); *A43B 13/206* (2013.01); *A43B 13/12* (2013.01)

(58) Field of Classification Search
CPC ... A43B 13/181; A43B 13/187; A43B 13/206; A43B 13/122; A43B 13/12; A43B 1/0009
See application file for complete search history.

(56) References Cited

U.S. PATENT DOCUMENTS

| | | | |
|---|---|---|---|
| 9,375,041 B2 | 6/2016 | Plant | |
| 2015/0075033 A1* | 3/2015 | Cross | A43B 3/0073 36/103 |
| 2015/0230548 A1 | 8/2015 | Cross | |
| 2015/0245685 A1* | 9/2015 | Cross | A43B 13/14 36/104 |
| 2016/0007681 A1* | 1/2016 | Langvin | A43B 13/42 36/103 |
| 2017/0009036 A1* | 1/2017 | Xie | B33Y 70/00 |
| 2017/0258180 A1 | 9/2017 | Cross et al. | |
| 2018/0317600 A1* | 11/2018 | Campos | A43B 13/20 |

FOREIGN PATENT DOCUMENTS

| | | |
|---|---|---|
| WO | 2015109359 A1 | 7/2015 |
| WO | 2016032626 A1 | 3/2016 |

* cited by examiner

*Primary Examiner* — Ted Kavanaugh
(74) *Attorney, Agent, or Firm* — Quinn IP Law

(57) ABSTRACT

An article includes a base component defining a plurality of holes arranged in an auxetic configuration. The auxetic configuration is configured such that when the base component is compressed in a first direction, the base component contracts in both the first direction and in a second direction orthogonal to the first direction. A surface of the base component defines at least one of the plurality of holes is shaped as a one-sheeted hyperboloid.

18 Claims, 8 Drawing Sheets

ARTICLE WITH AUXETIC SPACES AND METHOD OF MANUFACTURING

CROSS-REFERENCE TO RELATED APPLICATION

This application claims priority to, and the benefit of, U.S. Provisional Application No. 62/678,785 filed on May 31, 2018, the entire disclosure of which is incorporated by reference herein.

TECHNICAL FIELD

The present disclosure relates to an article with auxetic structures and, more particularly, to articles of footwear with soles having auxetic structures.

BACKGROUND

Articles of footwear typically have at least two major components, an upper that provides the enclosure for receiving the wearer's foot, and a sole secured to the upper that is the primary contact to the ground or playing surface. The footwear may also use some type of fastening system, for example, laces or straps or a combination of both, to secure the footwear around the wearer's foot. The sole may comprise three layers—an inner sole, a midsole and an outer sole. The outer sole is the primary contact to the ground or the playing surface. The outer sole generally carries a tread pattern and/or cleats or spikes or other protuberances that provide the wearer of the footwear with improved traction suitable to the particular athletic, work or recreational activity, or to a particular ground surface.

DETAILED DESCRIPTION

Figure 1:
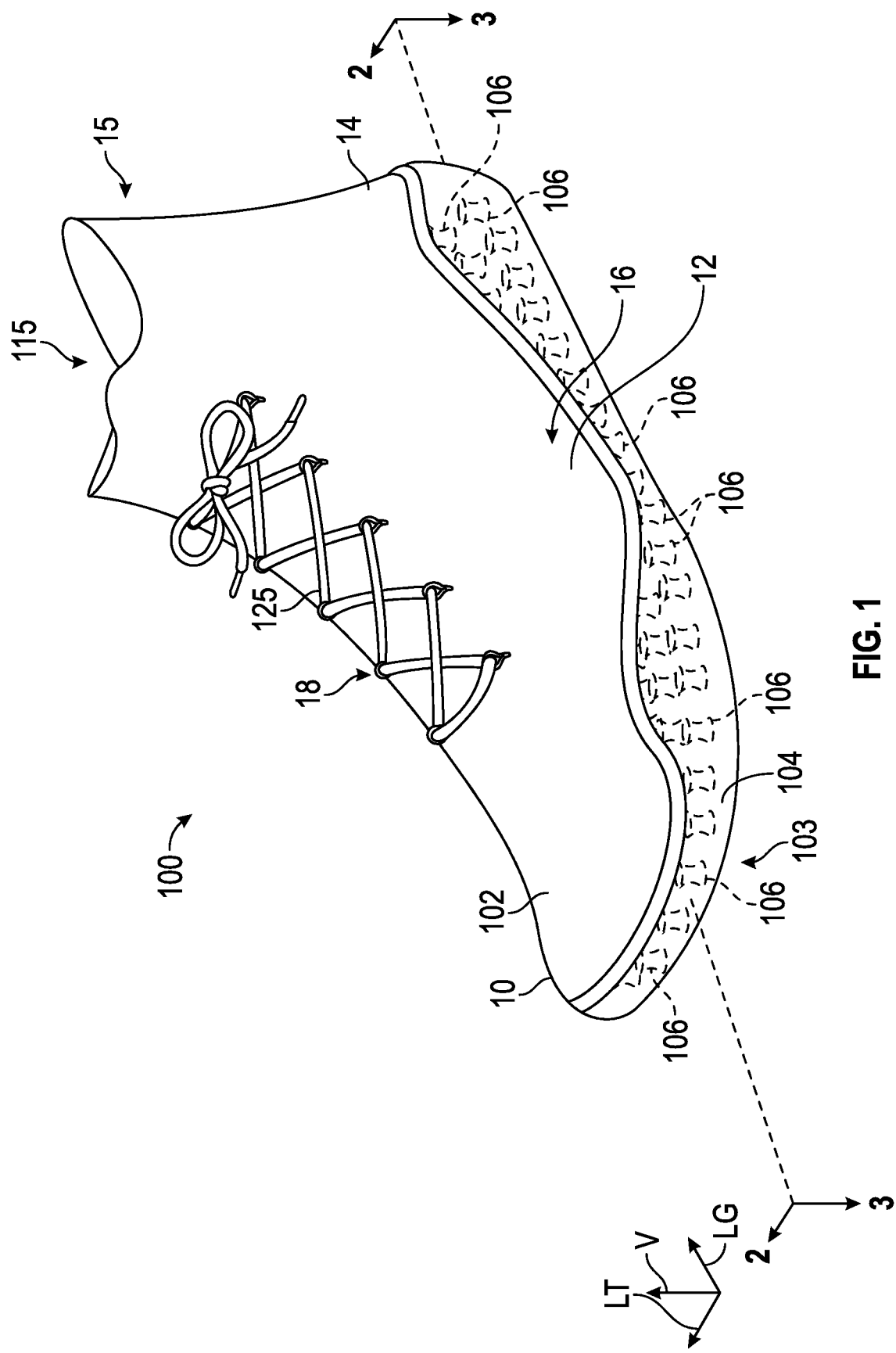
FIG. 1 is a schematic isometric view of an article of footwear, wherein the article of footwear includes an upper and a sole component.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The present disclosure describes an article, such as an article of footwear. In certain embodiments, the article includes a base component defining a plurality of holes arranged in an auxetic configuration. The auxetic configuration is configured such that when the base component is compressed in a first direction, the base component contracts in both the first direction and in a second direction orthogonal to the first direction. A surface of the base component defining at least one of the plurality of holes is shaped as a one-sheeted hyperboloid. The surfaces of the base component at each of the plurality of holes may be shaped as one-sheeted hyperboloids. Such holes are referred to herein as "auxetic spaces."

In some embodiments, the holes may be arranged in rows extending along the first direction. At least two of the rows may be parallel to each other, and the plurality of holes in said at least two of the rows are aligned with one another. The holes in at least two adjacent ones of the rows may be offset relative to each other. The article may have a first surface, a second surface opposite the first surface, and the plurality of holes are between the first surface and the second surface.

In some embodiments, at each of the plurality of holes, an internal surface of the base component may define a first end surface and a second end surface. The first end surface may be closer to the first surface than to the second surface. The second end surface may be closer to the second surface than to the first surface. Each of the holes may define a central portion disposed between the first end surface and the second end surface. The holes may include a first hole and a second hole adjacent the first hole. The first end surface at the second hole may be closer to the central portion of the first hole than to the second end surface at the first hole. The base component may include a base material, and each of the holes may be entirely surrounded by the base material. The base material may include foam.

In some embodiments, upon application of a compressive force on the base component, the base material may collapse into the holes in a rotating motion. The surfaces of the base component at each of the plurality of holes may be shaped as one-sheeted hyperboloids. Each of the holes may define a central axis. Each of the holes may be symmetrical about the central axis. The base material may collapse into the plurality of holes by rotating about the central axis of each of the plurality of holes.

In some embodiments, the surfaces of the base component at each of the plurality of holes may be shaped as one-sheeted hyperboloids, and the holes may have different sizes. The base component may include a forefoot portion, a heel portion, and a midfoot portion disposed between the heel portion and the forefoot portion, and the sizes of the holes at the heel portion are different from sizes of the plurality of holes at the forefoot portion. The sizes of the plurality of holes continuously decrease from the heel portion to the forefoot portion. The holes may include a first hole and a second hole, and each of the first hole and the second hole may be shaped as a one-sheeted hyperboloid. The first hole may be obliquely angled relative to the second hole. The article may be a sole component for an article of footwear.

The present disclosure also describes an article of footwear. The article of footwear includes an upper and a sole component coupled to the upper. The internal surfaces of the sole component define a plurality of holes arranged in an auxetic configuration. The auxetic configuration is configured such that when the sole component is compressed in a first direction, the sole component contracts in both the first direction and in a second direction orthogonal to the first direction. The internal surfaces define sides of the plurality of holes and are shaped as one-sheeted hyperboloids.

In some embodiments, the holes may be arranged in rows extending along the first direction. At least two of the rows may be parallel to each other, and the holes in said at least two of the rows are aligned with one another. The holes in at least two adjacent ones of the rows may be offset relative to each other. The sole component may have a first surface, a second surface opposite the first surface, and the holes may be between the first surface and the second surface. The internal surfaces may define a first end surface and a second end surface of each of the holes. The first end surface may be closer to the first surface than to the second surface. The second end surface may be closer to the second surface than to the first surface. Each of the holes may define a central portion disposed between the first end surface and the second end surface. The holes may include a first hole and a second hole adjacent the first hole. The first end surface of the second hole may be closer to the central portion of the first hole than to the first end surface of the first hole.

In some embodiments, the sole may include a sole material, and each of the holes may be entirely surrounded by the sole material. The sole material may include foam.

In some embodiments, upon application of a compressive force on the sole component, the sole material may collapse into the plurality of holes in a rotating motion. Each of the holes may define a central axis and may be symmetrical about the central axis. The sole material may collapse into the holes by rotating about the central axis of each of the holes. The holes may have different sizes. The sole component may include a forefoot portion, a heel portion, and a midfoot portion disposed between the heel portion and the forefoot portion. The sizes of the holes at the heel portion may be different from sizes of the plurality of holes at the forefoot portion. The sizes of the holes may continuously decrease from the heel portion to the forefoot portion. The holes may include a first hole and a second hole, and the first hole may be obliquely angled relative to the second hole.

In some embodiments, the plurality of holes includes a first group of holes and a second group of holes separated by a transition region. The transition region lacks holes. The first group of holes and the second group of holes have different orientations.

In some embodiments, the sole component includes a plurality of vertically stacked layers. The holes in the vertically stacked layers have different orientations.

In some embodiments, the sole component includes a plurality of vertically stacked layers. The holes in the vertically stacked layers have different sizes.

The present disclosure also describes methods of manufacturing an article. In some embodiments, the method includes producing a base component such that the base component includes a foam matrix and a plurality of bodies embedded in the foam matrix, wherein at least some of the bodies are shaped as one-sheeted hyperboloids and include a water-soluble material. Next, the base component is immersed in water to dissolve the plurality of bodies and define a plurality of holes disposed inside the base component. The water-soluble material may include polyacrylic acid. The bodies may be coupled to each other and are part of a one-piece cellular structure. Producing the base component may include three-dimensional printing of the foam matrix.

In some embodiments, the method includes the following step: 3-D printing a base component such that the base component includes a foam and a plurality of holes disposed inside the foam, wherein internal surfaces of the base component defining at least some of the plurality of holes are shaped as one-sheeted hyperboloids.

In some embodiments, the method includes the following steps: (1) injecting a polymeric material into a cavity of a mold; (2) inserting an injection molding tool into the cavity, wherein the injection molding tool includes a plurality of bodies, wherein each of the plurality of bodies has a surface shaped as a one-sheeted hyperboloid; and (3) removing the injecting molding tool from the cavity. The injection molding tool may include a support body and a plurality of rods coupled to the support body. Each of the bodies may be attached at an end of a respective one of the rods.

In some embodiments, the method includes the following steps: (1) placing foam on a die; and (2) moving a ram toward the foam until the ram passes through the foam in order to extrude portions of the foam. The ram includes a plurality of bodies, and each of the plurality of bodies has a surface shaped as a one-sheeted hyperboloid.

FIG. 1 is an isometric view of an embodiment of an article of footwear 100. In the exemplary embodiment, article of footwear 100 has the form of an athletic shoe. However, in other embodiments, the provisions discussed herein for article of footwear 100 could be incorporated into various other kinds of footwear including, but not limited to: basketball shoes, hiking boots, soccer shoes, football shoes, sneakers, running shoes, cross-training shoes, rugby shoes, baseball shoes as well as other kinds of shoes. Moreover, in some embodiments, the provisions discussed herein for article of footwear 100 could be incorporated into various other kinds of non-sports related footwear, including, but not limited to: slippers, sandals, boots, high-heeled footwear, and loafers.

For purposes of clarity, the following detailed description discusses the features of article of footwear 100, also referred to simply as article 100. However, it will be understood that other embodiments may incorporate a corresponding article of footwear (e.g., a right article of footwear when article 100 is a left article of footwear) that may share some, and possibly all, of the features of article 100 described herein and shown in the figures.

The embodiments may be characterized by various directional adjectives and reference portions. These directions and reference portions may facilitate in describing the portions of an article of footwear. Moreover, these directions and reference portions may also be used in describing sub-components of an article of footwear (e.g., directions and/or portions of an inner sole component, a midsole component, an outer sole component, an upper or any other components).

For consistency and convenience, directional adjectives are employed throughout this detailed description corresponding to the illustrated embodiments. The term "longitudinal" as used throughout this detailed description and in the claims, refers to a direction extending a length of a component (e.g., an upper or sole component). In some cases, the longitudinal direction LG may extend from a forefoot portion to a heel portion of the component. Also, the term "lateral" as used throughout this detailed description and in the claims, refers to a direction extending along a width of a component. In other words, the lateral direction LT may extend between a medial side and a lateral side of a component. Furthermore, the term "vertical" as used throughout this detailed description and in the claims, refers to a direction generally perpendicular to the lateral direction LT and the longitudinal direction LG. For example, in cases where an article is planted flat on a ground surface, the vertical direction V may extend from the ground surface upward. The vertical direction V is perpendicular to the lateral direction LT and the longitudinal direction LG. The lateral direction LT is perpendicular to the longitudinal direction LG. Additionally, the term "inner" refers to a portion of an article disposed closer to an interior of an article, or closer to a foot when the article is worn. Likewise, the term "outer" refers to a portion of an article disposed further from the interior of the article or from the foot. Thus, for example, the inner surface of a component is disposed closer to an interior of the article than the outer surface of the component. This detailed description makes use of these directional adjectives in describing an article and various components of the article, including an upper, a midsole structure and/or an outer sole structure.

The article 100 may be characterized by a number of different regions or portions. For example, the article 100 could include a forefoot portion, a midfoot portion, a heel portion and an ankle portion. Moreover, components of article 100 could likewise comprise corresponding portions. Referring to FIG. 1, the article 100 may be divided into an article forefoot portion 10, an article midfoot portion 12 and an article heel portion 14. The article forefoot portion 10 may be generally associated with the toes and joints connecting the metatarsals with the phalanges. The article midfoot portion 12 may be generally associated with the arch of a foot. Likewise, the article heel portion 14 may be generally associated with the heel of a foot, including the calcaneus bone. The article 100 may also include an ankle portion 15 (which may also be referred to as a cuff portion). In addition, the article 100 may include an article lateral side 16 and an article medial side 18. In particular, the article lateral side 16 and the article medial side 18 may be opposing sides of the article 100. Furthermore, both the article lateral side 16 and the article medial side 18 may extend through the article forefoot portion 10, the article midfoot portion 12, the article heel portion 14, and ankle portion 15.

In the depicted embodiment, the article 100 includes an upper 102 and a sole 103 coupled to the upper 102. The sole 103 includes a base component 104. The base component 104 may also be referred to herein as a sole component. Although the drawings show the article 100 as an article of footwear, it is contemplated that the article 100 may be other kinds of article, such as an article of clothing. Thus, the article 100 does not necessarily include an upper and a sole. Rather, the article 100 may simply include the base component 104.

Generally, the upper 102 may be any type of upper. In particular, the upper 102 may have any design, shape, size and/or color. For example, in embodiments where the article 100 is a basketball shoe, upper 102 could be a high top upper that is shaped to provide high support on an ankle. In embodiments where the article 100 is a running shoe, the upper 102 could be a low top upper.

In some embodiments, the upper 102 includes an ankle opening 115 that provides entry for the foot into an interior cavity of the upper 102. In some embodiments, the upper 102 may also include a tongue (not shown) that provides cushioning and support across the instep of the foot. Some embodiments may include fastening provisions, including, but not limited to: laces, cables, straps, buttons, zippers as well as any other provisions known in the art for fastening articles. In some embodiments, a lace 125 may be applied at a fastening region of upper 102.

Some embodiments may include uppers that extend beneath the foot, thereby providing 360-degree coverage at some regions of the foot. However, other embodiments need not include uppers that extend beneath the foot. In other embodiments, for example, an upper could have a lower periphery joined with a sole structure and/or sock liner.

An upper could be formed from a variety of different manufacturing techniques resulting in various kinds of upper structures. For example, in some embodiments, an upper could have a braided construction, a knitted (e.g., warp-knitted) construction or some other woven construction. In an exemplary embodiment, upper 102 may be a knitted upper.

In some embodiments, the sole 103 may be configured to provide traction for the article 100. In addition to providing traction, the sole 103 may attenuate ground reaction forces FR when compressed between the foot and the ground during walking, running or other ambulatory activities. The configuration of the sole 103 may vary significantly in different embodiments to include a variety of conventional or non-conventional structures. In some cases, the sole 103 can be configured according to one or more types of ground surfaces on which sole 103 may be used. Examples of ground surfaces include, but are not limited to: natural turf, synthetic turf, dirt, hardwood flooring, as well as other surfaces.

The sole 103 is secured to the upper 102 and extends between the foot and the ground when the article 100 is worn. In different embodiments, the sole 103 may include different components. In the exemplary embodiment shown in FIG. 1, the sole 103 includes at least the base component 104.

With reference to FIGS. 1-4, the base component 104 includes a base forefoot portion 121, a base heel portion 123, and a base midfoot portion 127 disposed between the base heel portion 123 and the base forefoot portion 121. The base component 104 defines an inner surface 150 and an outer surface 152 opposite the inner surface 150. The thickness T of the base component 104 is defined from the inner surface 150 to the outer surface 152 along the vertical direction V. In the depicted embodiment, the thickness of the base component 104 continuously decreases from the base heel portion 123 toward the base forefoot portion 121 to enhance comfort for a user when the article 100 is used as an article of footwear.

The base component 104 defines a plurality of holes 106 arranged in an auxetic configuration. Structures with an auxetic configuration have a negative Poisson's ratio, such that when they are under tension in a first direction FD, their dimensions increase both in the first direction FD and in a second direction SD orthogonal or perpendicular to the first direction FD. Also, when structures with an auxetic configuration are under compression in the first direction FD, their dimensions decrease both in the first direction FD and in the second direction SD orthogonal or perpendicular to the first direction FD. The holes 106 provide the base component 104 with an auxetic configuration to facilitate expansion and/or adaptability of a base component 104 during dynamic motions. In the depicted embodiments, the base component 104 have at least one surface defining at least one of the holes 106. The surface 108 at least partially defining the hole 106 is shaped as a one-sheeted hyperboloid to provide the base component 104 with the auxetic configuration. The one-sheeted hyperboloid shape allows the material forming the base component 104 to compress in a rotating motion about at least one of the holes 106, thereby increasingly densifying the base component 104 in response to a compressive force F. As a result, the base component 104 provides an enhanced support to a user when the base component 104 is subjected to a compressive force F.

In the depicted embodiment, the base component 104 includes a plurality of surfaces 108 each defining one of the holes 106. The surfaces 108 may be inner surfaces entirely disposed within between the inner surface 150 and the outer surface 152 of the base component 104 in order to facilitate expansion and/or adaptability of a base component 104 during dynamic motions without compromising comfort to the user. In particular, each of the holes 106 has a height H, and the height H of the holes 106 may always be less than the thickness T of the base component 104 to facilitate expansion and/or adaptability of a base component 104 during dynamic motions. The surfaces 108 of the base component 104 at each of the holes 106 are shaped as one-sheeted hyperboloids (e.g., one-sheeted circular hyperboloids and/or one-sheeted elliptical hyperboloids). The holes 106 may be arranged in rows extending along a first direction FD (e.g., the longitudinal direction LG). One row of holes 106 may be spaced apart from the other rows of holes 106 along a second direction SD (e.g., the lateral direction LT). In the depicted embodiment, the base component 104 may include a first row 110, a second row 112, and a third row 114 of holes 106 each extending along the longitudinal direction LG. At least two of the rows of holes 106 are parallel to each other. For instance, the first row 110, the second row 112, and the third row 114 of holes 106 may be parallel to one another. Notably, the first row 110, the second row 112, and the third row 114 of holes 106 do not necessarily extend along the entire length of the base component 104. The holes 106 in at least two of the rows (e.g., first row 110 and third row 114), may be aligned with one another along the longitudinal direction LG, while another row of holes 106 (e.g., second row 112) may be longitudinally offset relative to the other rows (e.g., first row 110 and third row 114).

The base component 104 is wholly or partly made of a base material, which may be foam, such as, but not limited to, a thermoplastic polyurethane foam. If the base component 104 is part of the sole 103, the base material may be referred to as the sole material. Each of the holes 106 is entirely surrounded by the base material to facilitate expansion and/or adaptability of a base component 104 during dynamic motions without compromising comfort to the user.

The surfaces 108 at least partially defining the holes are each shaped as a one-sheeted hyperboloid to enhance cushioning when the base component 104 is subjected to a compressive force F. Upon application of the compressive force F on the base component 104, the base component 104 collapses into the holes 106 in a rotating motion as indicated by arrows R. As a result, the base component surrounding the holes 106 compresses in an auxetic fashion. As such, upon application of the compressive force F, the dimensions of the base component 104 decrease both in a first direction FD and in a second direction SD orthogonal or perpendicular to the first direction FD. In other words, wherein the holes 106 have an auxetic configuration and are therefore configured, such that when the sole component is compressed in the first direction FD, the base component 104 contracts in both the first direction FD and in the second direction SD, which is orthogonal to the first direction FD. Each of the holes 106 defines a central axis CX, and each of the plurality of holes 106 is symmetrical about the central axis CX to facilitate the auxetic behavior of the base material. Upon application of the compressive force F, the base material collapses into holes 106 by rotating about the central axis CX of each of the holes 106.

Figure 2:
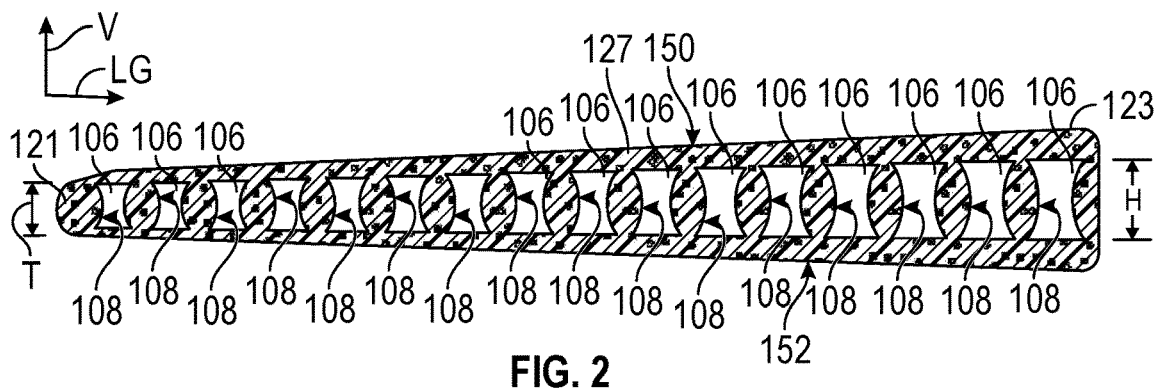
FIG. 2 is a schematic sectional side view of the sole shown in FIG. 1, taken along section lines 2-2 of FIG. 1, wherein the sole defines a plurality of holes.
Figure 3:
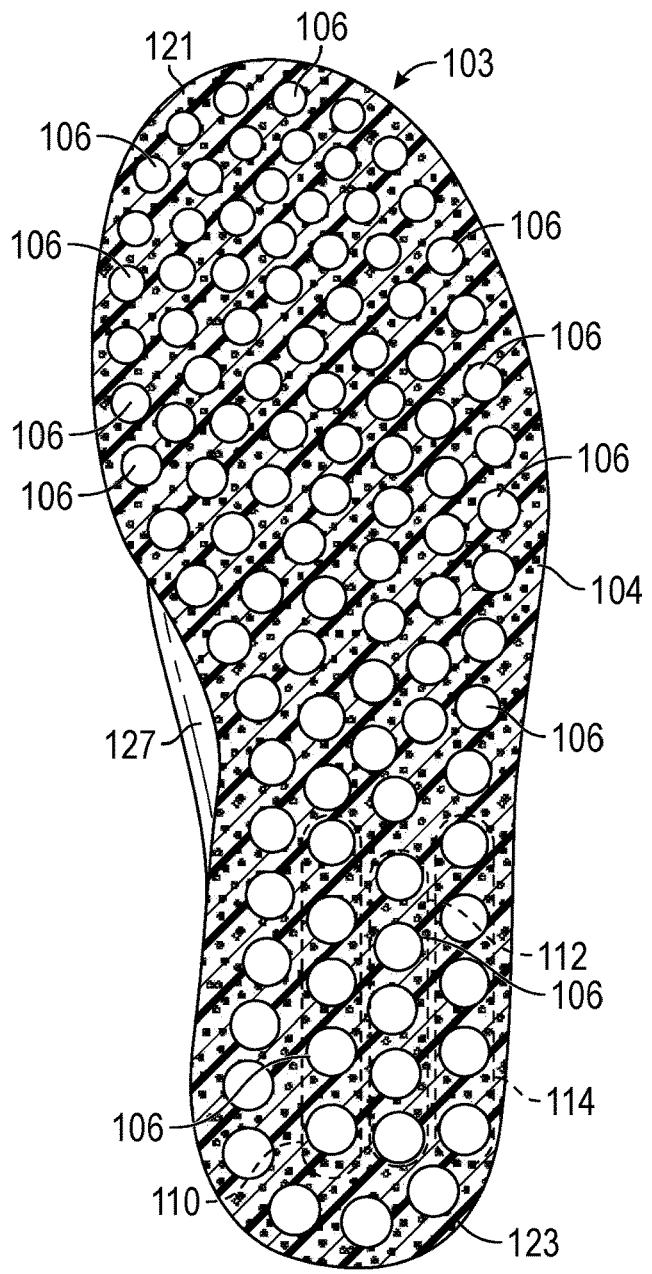
FIG. 3 is a schematic sectional top view of the sole shown in FIG. 1, taken along section lines 3-3 of FIG. 1.
Figure 4:
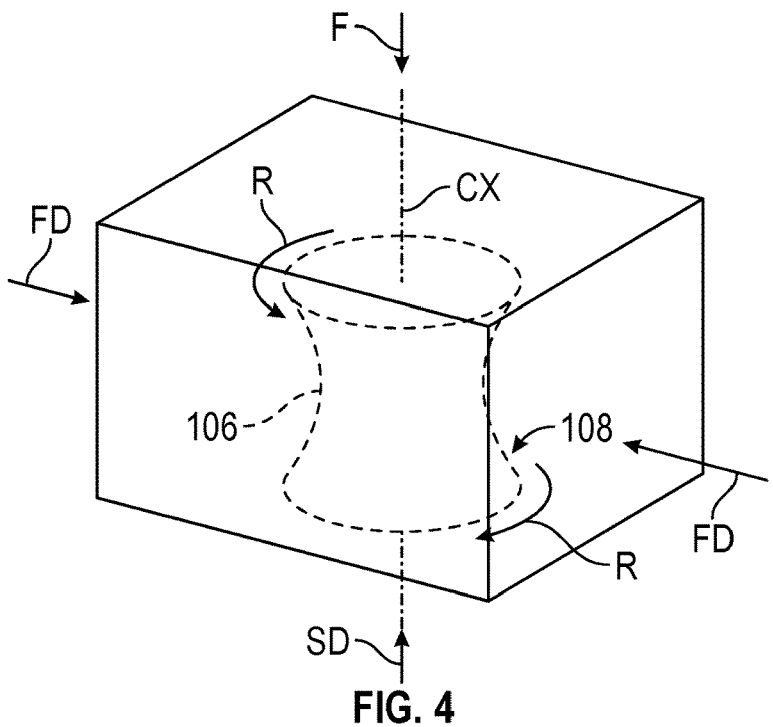
FIG. 4 is a schematic isometric view of a portion of the sole, depicting one of the holes undergoing an auxetic compression.

With specific reference to FIG. 2, the surfaces 108 of the base component 104 at each of the holes 106 are shaped as one-sheeted hyperboloids, and the holes 106 have different sizes. In the depicted embodiment, for example, the sizes of the holes 106 at the base heel portion 123 are different from sizes of the holes at the base forefoot portion 121. As a non-limiting example, the sizes of the holes 106 continuously decrease from the base heel portion 123 to the base forefoot portion 121 to enhance cushioning for a user with a hard heel strike. As discussed above, the thickness T of the base component T may continuously decrease from the base heel portion 123 toward the base forefoot portion 121 along the longitudinal direction LG. Likewise, the heights H of the holes 106 may continuously decrease from the base heel portion 123 toward the base forefoot portion 121.

Figure 5:
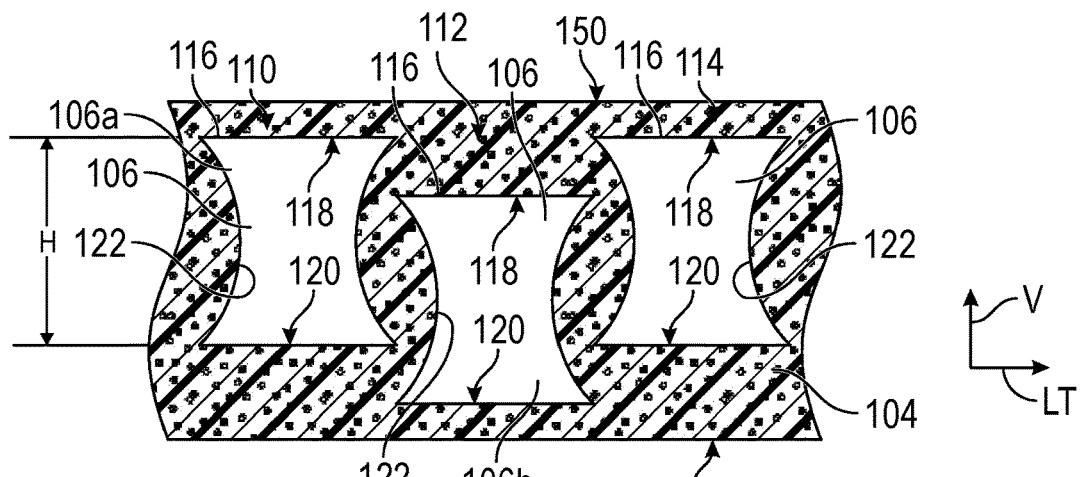
FIG. 5 is a schematic sectional side view of a portion of the sole, depicting a plurality of holes offset relative to each other along a vertical direction.

With reference to FIG. 5, the holes 106 in at least two adjacent rows (e.g., first row 110 and second row 112) may be offset relative to each other along the vertical direction V to provide tailored cushioning taking into account different users strides. As discussed above, the holes 106 may be entirely disposed between the inner surface 150 (e.g., a first surface) and the outer surface 152 (e.g., a second surface). At each of the holes 106, an internal surface 116 of the base component 104 defines a first end surface 118 and a second end surface 120 opposite the first end surface 118. The height H of each hole 106 may be defined as the distance from the first end surface 118 to the second end surface 120 along the vertical direction V. The first end surface 118 is closer to the inner surface 150 (e.g., a first surface) than to the outer surface 152 (e.g., a second surface). The second end surface 120 is closer to the outer surface 152 (e.g., a second surface) than to the inner surface 150 (e.g., a first surface). Each of the holes 106 defines a central portion 122 disposed between the first end surface 118 and the second end surface 120. The holes 106 includes a first hole 106a and a second hole 106b adjacent the first hole 106a. The first end surface 118 at the second hole 106b is closer to the central portion 122 of the first hole 106a than to the second end surface 120 at the first hole 106a.

Figure 6:
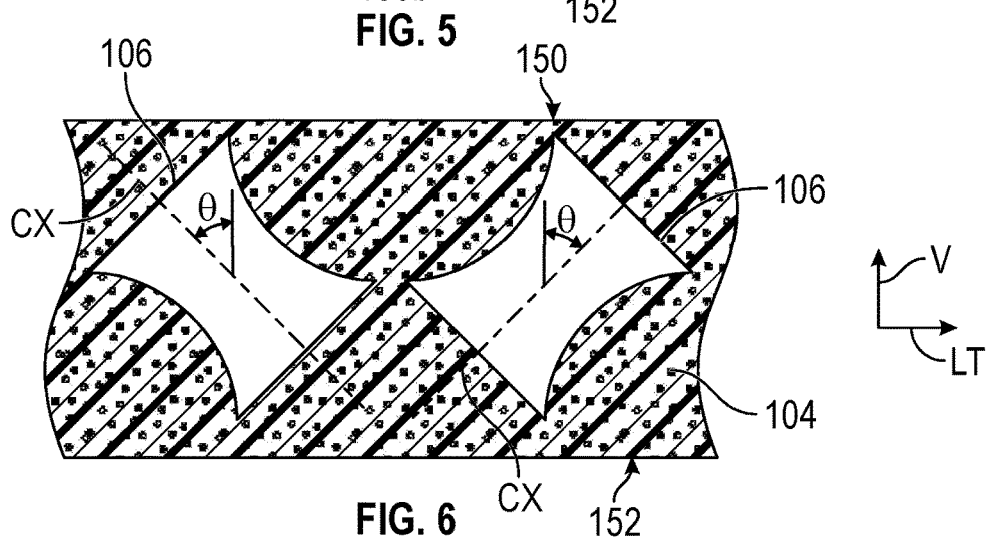
FIG. 6 is a schematic sectional side view of a portion of the sole, depicting a plurality of holes obliquely angled relative to each other.
Figure 7:
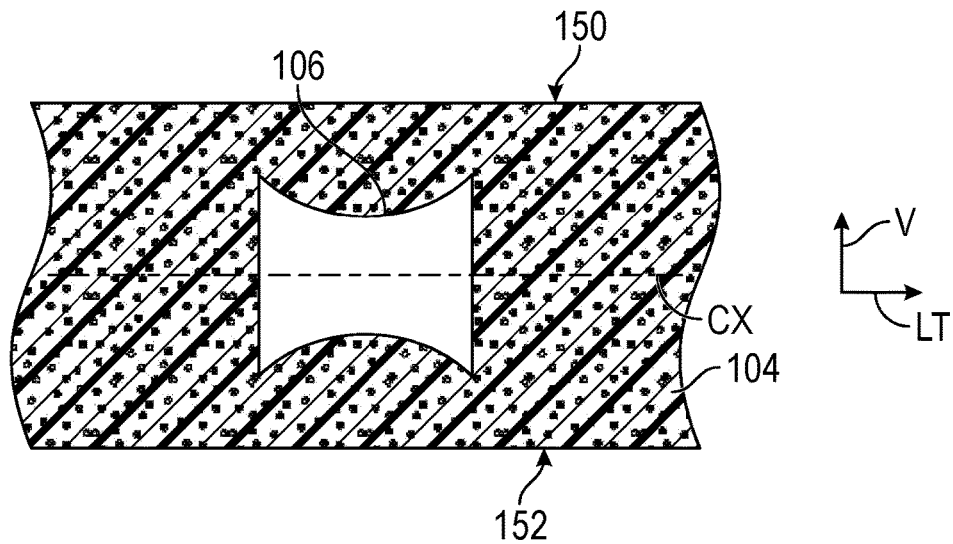
FIG. 7 is a schematic sectional side view of a portion of the sole, depicting a hole in a horizontal orientation.

With reference to FIG. 6, the base component 104 may include holes 106 that obliquely angled relative to the one another to accommodate particular cushioning needs. For instance, the center axis CX of each hole 106 is offset from the vertical direction by an oblique angle θ. As a non-limiting example, the angle oblique angle θ may be 45 degrees. Additionally, or alternatively, at least one of the holes 106 may be oriented horizontally as shown in FIG. 7 (instead of vertically as shown in FIG. 2) in order to enhance the auxetic properties of the base component 104 along the longitudinal direction LG and lateral direction LT.

Figure 8:
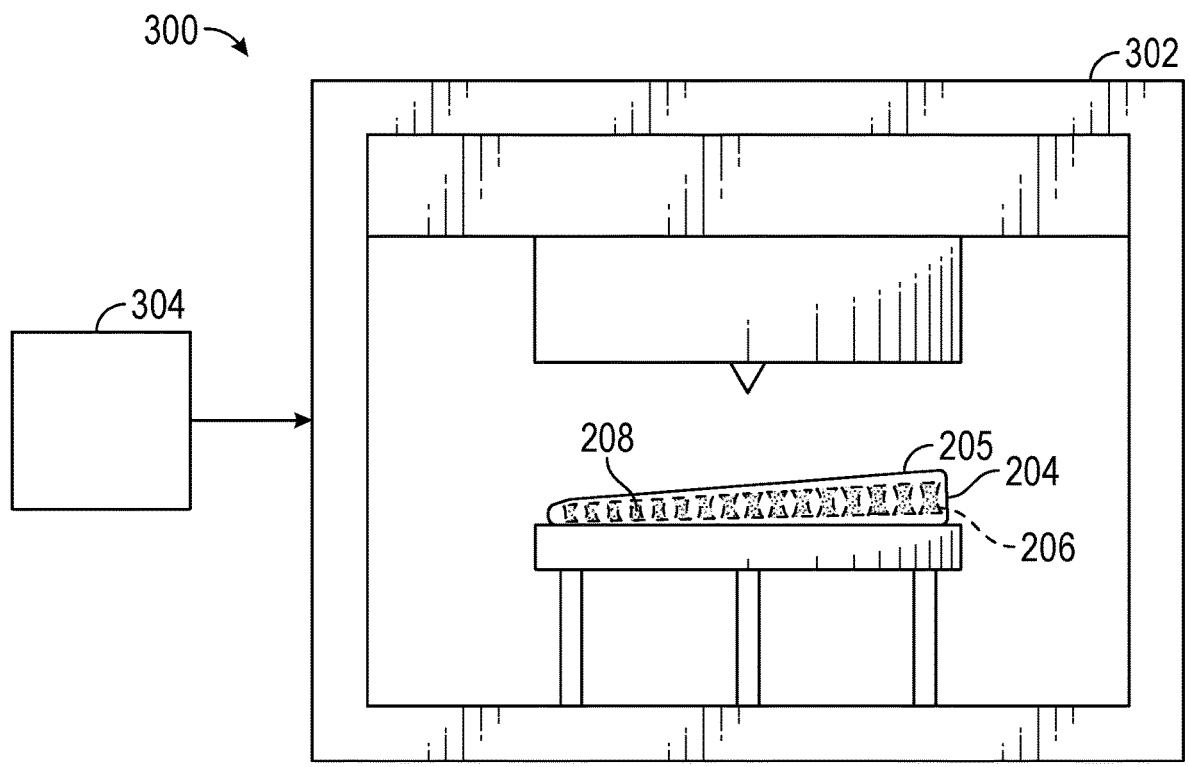
FIG. 8 is a schematic side view of a three-dimensional ("3-D") printing system programmed to form a sole according to any of the embodiments described in this disclosure.
Figure 9:
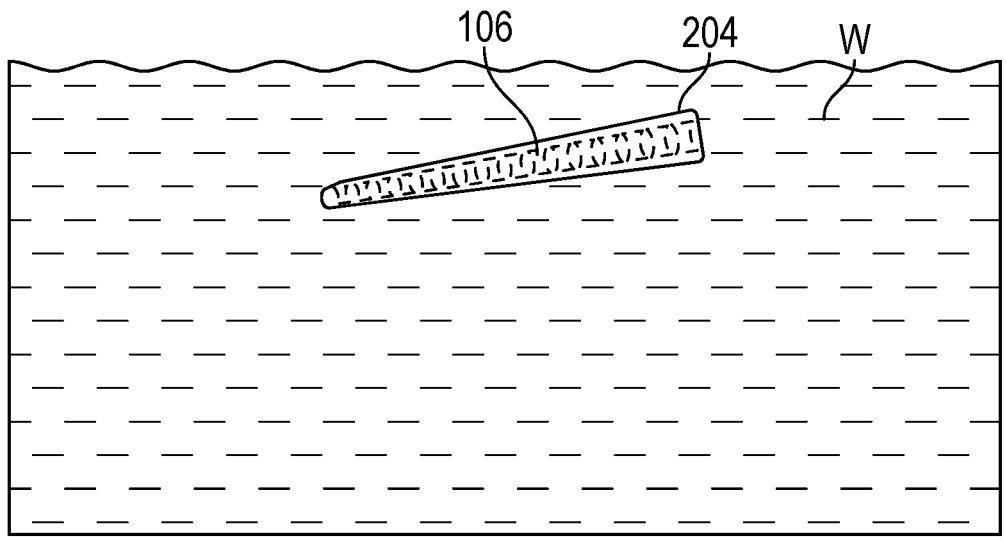
FIG. 9 is a schematic side view of a base component of a sole immersed in water.

With reference to FIGS. 8 and 9, a method of manufacturing the article 100 (or simply the base component 104) may include producing a base component 204 such that the base component 204 includes a foam matrix 205 and a plurality of bodies 206 embedded in the foam matrix 205. At least some of the bodies 206 are shaped as one-sheeted hyperboloids and include a water-soluble material as shown in FIG. 8. Next, the base component 204 is immersed in water W to dissolve the plurality of bodies 206 and define a plurality of holes 106 disposed inside the base component 204 as shown in FIG. 9.

As shown in FIG. 8, the base component 204 may be produced by three-dimensional printing of the foam matrix 205. To do so, a three-dimensional printing system 300 may be used. The three-dimensional printing system includes a 3-D printer 302 and a controller 304 in communication with the 3-D printer. The controller 304 is specifically programmed to produce the base component 204 and includes a processor and a non-transitory memory including instructions (e.g., a virtual model of the base component 204) to produce the base component 204 with the bodies 206 made of a water-soluble material 208 and the remainder of the base component 204 made of foam. The water-soluble material 208 may include material includes polyacrylic acid. The bodies 206 may be coupled to each other and may be part of a one-piece cellular structure.

Alternatively, the method of manufacturing the article 100 (or simply the base component 104) may include 3-D printing a base component 204 such that the base component 204 includes a foam matrix 205 and a plurality of holes (such as holes 106 shown in FIG. 2) disposed inside the foam matrix 205. The internal surfaces of the base component 204 define at least some of the plurality of holes 106 are shaped as one-sheeted hyperboloids.

Figure 10:
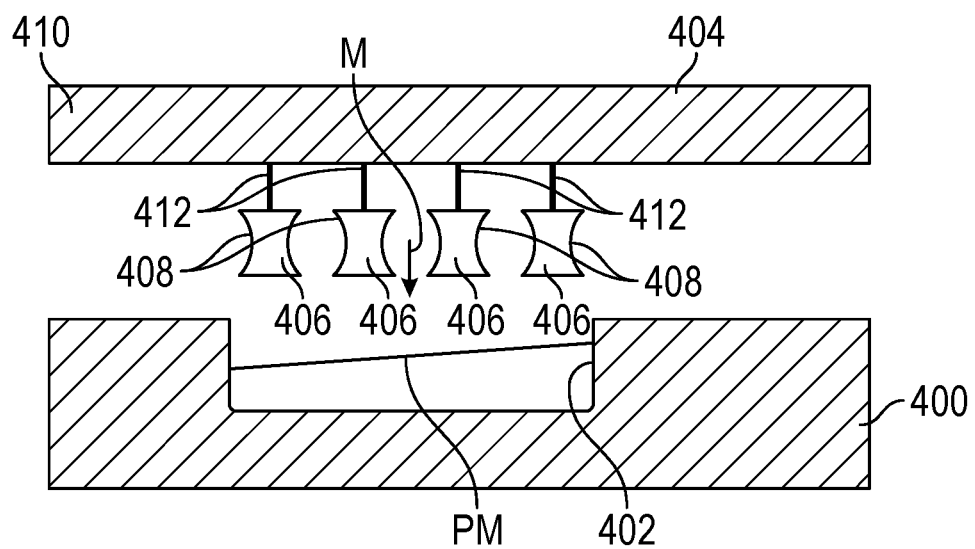
FIG. 10 is a schematic side sectional view of an injection tool assembly including an injection tool for forming a base component of a sole according to any of the embodiments described in this disclosure.
Figure 11:
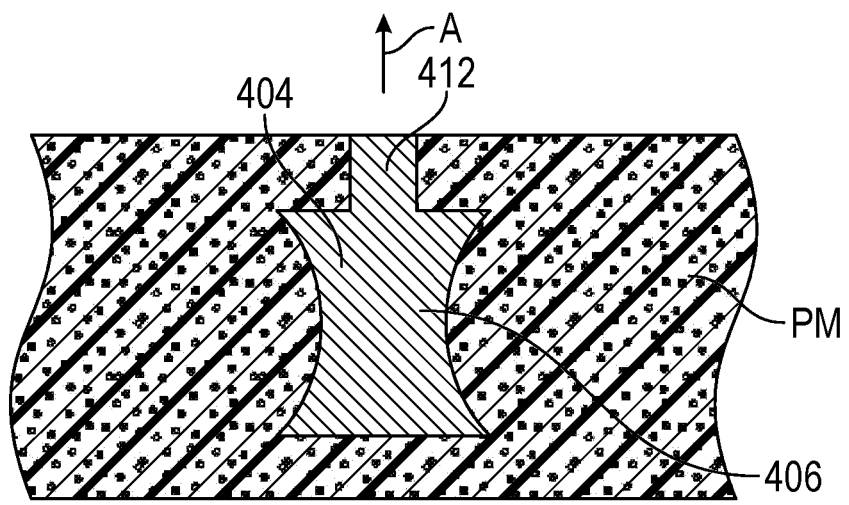
FIG. 11 is a schematic, enlarged side sectional view of part of the injection tool disposed within a foam matrix.

With reference to FIGS. 10 and 11, in other embodiments, the method of manufacturing the article 100 (or simply the base component 104) includes injecting a polymeric material PM (FIG. 11) into a cavity 402 of a mold 400 as shown in FIG. 10. After injecting the polymeric material PM, at least part of an injection molding tool 404 is inserted into the cavity 402. In doing so, the injection molding tool 404 is moved toward the cavity 402 of the mold 400 in the direction indicated by arrow M as shown in FIG. 10. The injection molding tool 404 includes a plurality of bodies 406. Each of the bodies 406 has a surface 408 shaped as a one-sheeted hyperboloid. Further, the injection molding tool 404 includes a support body 410 and a plurality of rods 412 coupled to the support body 410. Each of the bodies 406 is attached at an end of a respective rod 412. Next, the injection molding tool 404 is removed from the cavity 402 of the mold 400. In doing so, the injection molding tool 404 (along with the bodies 406) is moved away from the polymeric material PM in the direction indicated by arrow A as shown in FIG. 11.

Figure 12:
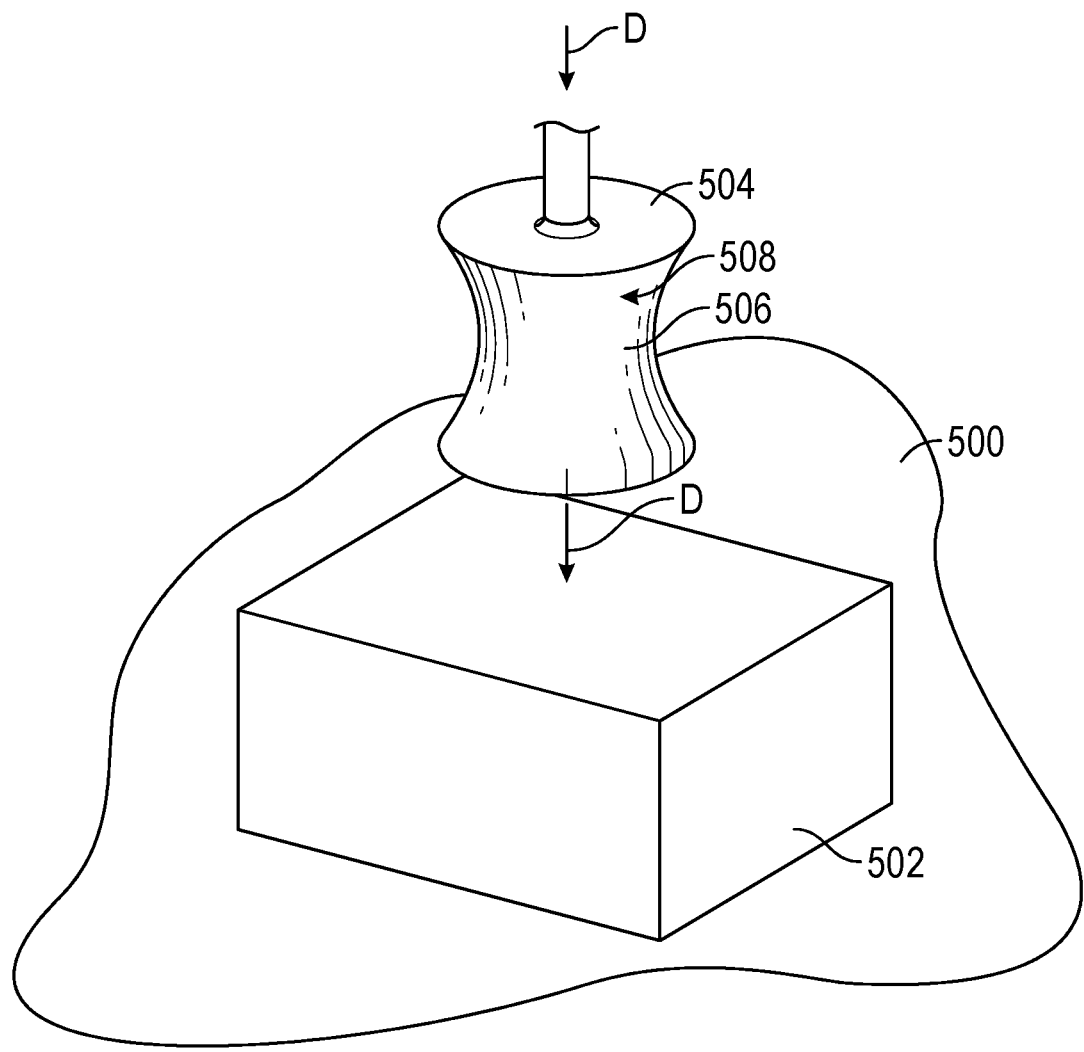
FIG. 12 is a schematic isometric view of a ram moving toward a foam block.

With reference to FIG. 12, in other embodiments, the method of manufacturing the article 100 (or simply the base component 104) includes placing foam 502 (e.g., a solid foam block) on a die 500. Then, a ram 504 is moved toward the foam 502 until the ram 504 passes through the foam 502 in order to extrude portions of the foam 502. In doing so, the ram 504 is moved toward the foam 502 in the direction indicated by arrows D. The ram 504 includes a plurality of bodies 506 (one shown), and each of the bodies 506 has a surface 508 shaped as a one-sheeted hyperboloid.

Figure 13:
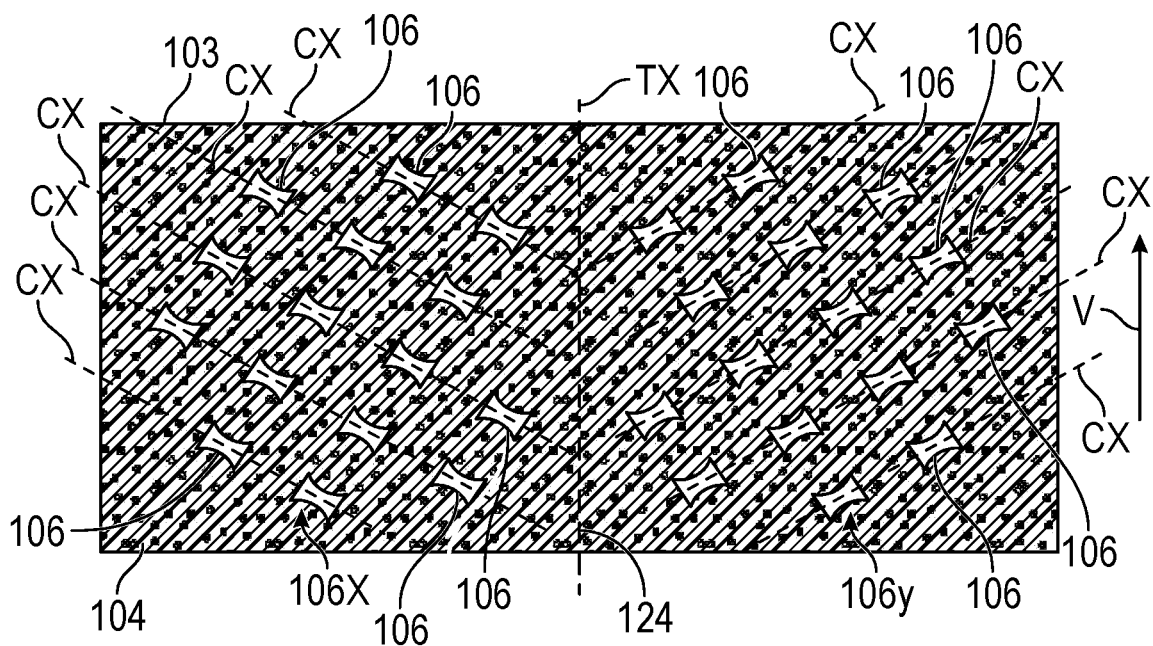
FIG. 13 is a schematic side sectional view of a portion of the sole, depicting a first group of holes and a second group of holes separated by a transition region without holes.

With reference to FIG. 13, in other embodiments, the sole 103 defines a first group of holes 106x and a second group of holes 106y separated by a transition region 124 without holes 106. As discussed above, each of the holes 106 is symmetrical about its central axis CX to facilitate the auxetic behavior of the base material. The central axes CX of all the holes 106 of the first group of holes 106x are parallel to each other, and the central axes CX of all the holes 106 of the second group of holes 106y are parallel to each other. However, the central axes CX of all the holes 106 of the first group of holes 106x are obliquely angled relative to the vertical direction and the central axes CX of all the holes 106 of the second group of holes 106y. The transition region 124 is located between the first group of holes 106x and the second group of holes 106y and may be symmetrical about a transition axis TX to facilitate symmetrical compression of the sole 103 about the transition axis TX. Because of its lack of holes 106, the transition region 124 acts as a mechanical stop to prevent further collapsing of the base material forming the base component 104. For this reason, when the base component 104 is compressed, the transition region 124 is more dense than the regions which have the first group of holes 106x and the second group of holes 106y. Accordingly, the base component 104 may be tuned by selecting the angle of the central axes CX of the holes 106 relative to the vertical direction V and placing the transition region 124 at a certain position.

Figure 14:
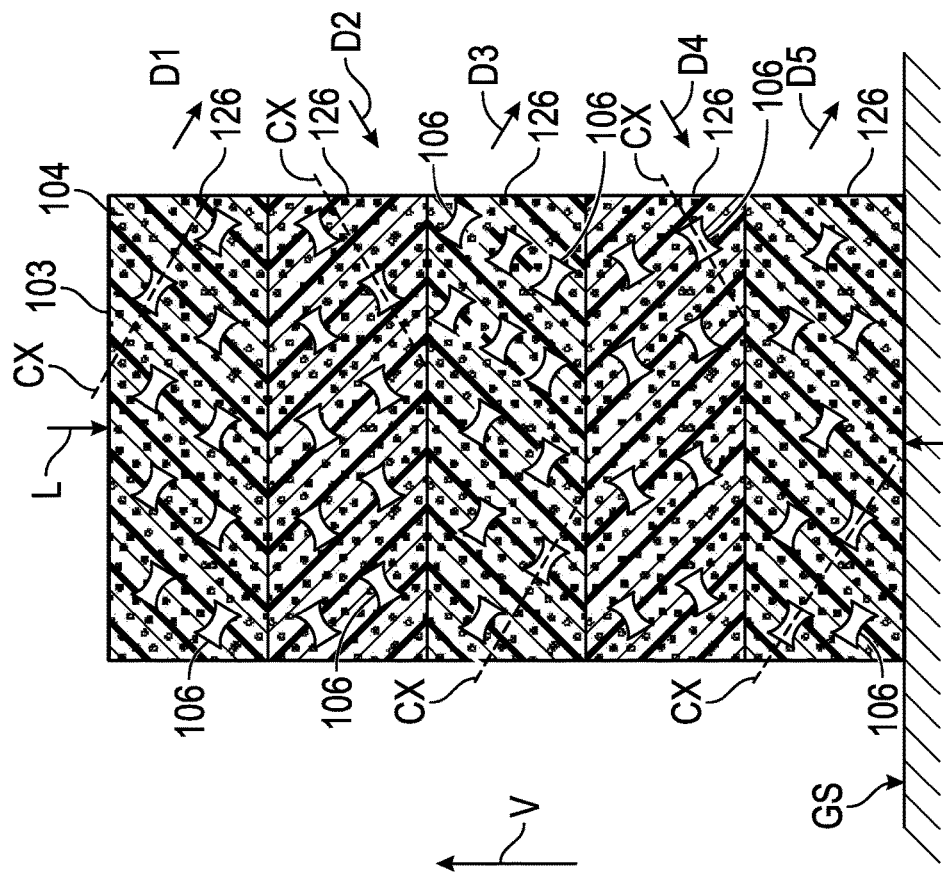
FIG. 14 is a schematic side sectional view of a portion of the sole, depicting stacked layers having holes with different orientations.

With reference to FIG. 14, in other embodiments, the sole 103 includes a plurality of vertically stacked layers 126 having differently configured base material (e.g., foam). In the depicted embodiment, the central axes CX of all the holes 106 in each layer 126 are parallel to each other. However, the central axes CX of the holes 106 in different layers 126 are may be obliquely angled relative to each other to cause the base material in the layers 126 to collapse in different directions D1, D2, D3, D3, and D5. For example, the central axes CX of the holes 106 in consecutively stacked layers 126 are obliquely angled relative to each other, whereas the central axes CS of holes 106 in alternating layers 126 may be parallel to each other. During operation, when a load L is applied to the sole 103, the base material in the layers 126 collapse in different directions D1, D2, D3, D3, and D5 due to the load L and the reaction force FR of the ground surface GS. As a result, the relationship between the load L applied to the sole 103 and the displacement of the base material is non-linear. Layers 126 close to the application of the load L have larger holes 106 than layers 126 closer to the ground surface GS in the embodiment shown. Accordingly, the layers 126 closer to the load L may experience greater deformation than the layers 126 closer to the ground surface GS.

Figure 15:
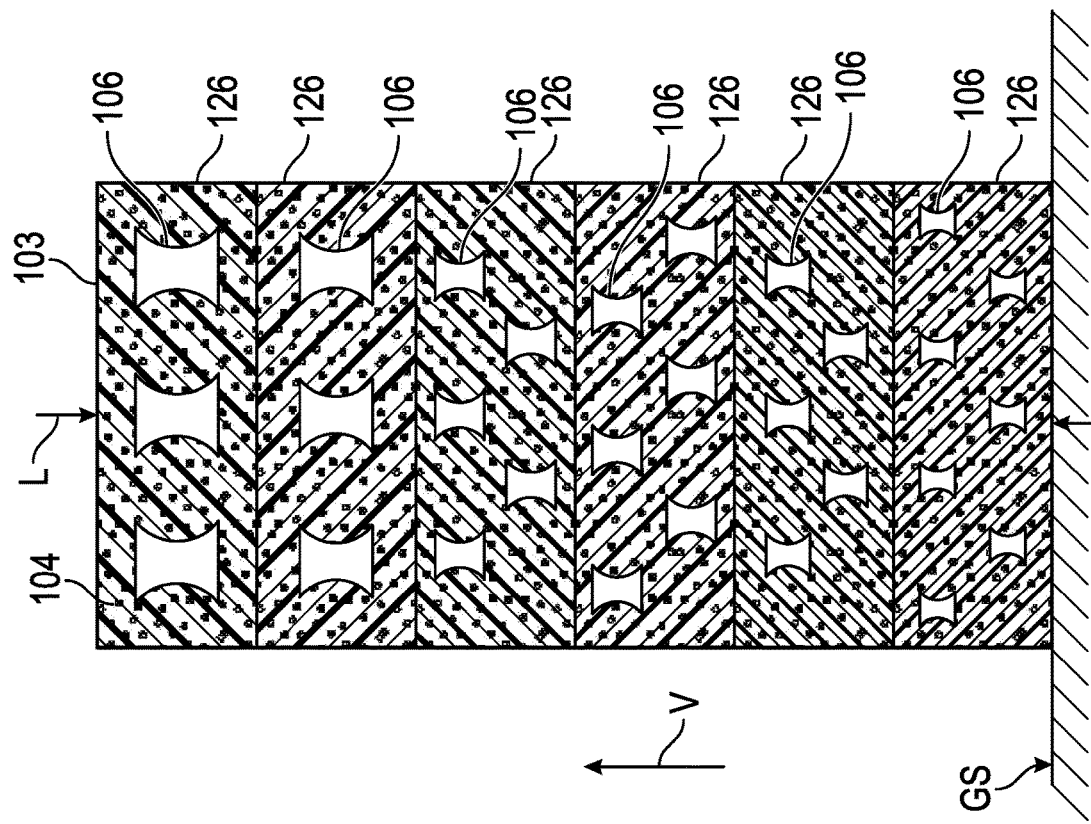
FIG. 15 is a schematic side sectional view of a portion of the sole, depicting stacked layers having holes with different sizes.

With reference to FIG. 15, in other embodiments, the sole 103 includes a plurality of stacked layers 126 having differently configured base material (e.g., foam). In the depicted embodiment, the holes 106 in the different layers 126 have different sizes. For instance, while the holes 106 in each layer 126 have the same size, the holes 106 in different layers increase in size in the vertical direction V. As a result, the relationship between the load L applied to the sole 103 and the displacement of the base material is non-linear.

The following Clauses provide example configurations of a sole structure for an article of footwear disclosed herein.

Clause 1. An article comprising: a base component defining a plurality of holes arranged in an auxetic configuration;

wherein the auxetic configuration is configured such that when the base component is compressed in a first direction, the base component contracts in both the first direction and in a second direction orthogonal to the first direction; and wherein a surface of the base component defining at least one of the plurality of holes is shaped as a one-sheeted hyperboloid.

Clause 2. The article according to Clause 1, wherein surfaces of the base component at each of the plurality of holes are shaped as one-sheeted hyperboloids.

Clause 3. The article according to any of Clauses 1 and 2, wherein the plurality of holes is arranged in rows extending along the first direction.

Clause 4. The article according to Clause 3, wherein at least two of the rows are parallel to each other, and the plurality of holes in said at least two of the rows are aligned with one another.

Clause 5. The article according to any of Clauses 3 and 4, wherein the plurality of holes in at least two adjacent ones of the rows are offset relative to each other.

Clause 6. The article according to any of Clauses 1-5, wherein: the article has a first surface, a second surface opposite the first surface, and the plurality of holes are between the first surface and the second surface; and at each of the plurality of holes, an internal surface of the base component defines a first end surface and a second end surface, the first end surface is closer to the first surface than to the second surface, the second end surface is closer to the second surface than to the first surface, each of the plurality of holes defines a central portion disposed between the first end surface and the second end surface, the plurality of holes includes a first hole and a second hole adjacent the first hole, and the first end surface at the second hole is closer to the central portion of the first hole than to the second end surface at the first hole.

Clause 7. The article according to any of Clause 1-6, wherein the base component includes a base material, and each of the plurality of holes is entirely surrounded by the base material.

Clause 8. The article according to any of Clauses 1-7, wherein the base material includes foam.

Clause 9. The article according to any of Clauses 7 and 8, wherein, upon application of a compressive force on the base component, the base material collapses into the plurality of holes in a rotating motion.

Clause 10. The article of any of Clauses 7-9, wherein surfaces of the base component at each of the plurality of holes are shaped as one-sheeted hyperboloids, each of the plurality of holes defines a central axis, each of the plurality of holes is symmetrical about the central axis, and the base material collapses into the plurality of holes by rotating about the central axis of each of the plurality of holes.

Clause 11. The article according any of Clauses 1-10, wherein surfaces of the base component at each of the plurality of holes are shaped as one-sheeted hyperboloids, and the plurality of holes have different sizes.

Clause 12. The article according to Clause 11, wherein the base component includes a forefoot portion, a heel portion, and a midfoot portion disposed between the heel portion and the forefoot portion, and sizes of the plurality of holes at the heel portion are different from sizes of the plurality of holes at the forefoot portion.

Clause 13. The article according to Clause 12, wherein the sizes of the plurality of holes continuously decrease from the heel portion to the forefoot portion.

Clause 14. The article according to any of Clauses 1-13, wherein the plurality of holes includes a first hole and a second hole, each of the first hole and the second hole is shaped as a one-sheeted hyperboloid, and the first hole is obliquely angled relative to the second hole.

Clause 15. The article according to any of Clauses 1-14, wherein the article is a sole component for an article of footwear.

Clause 16. An article of footwear, comprising: an upper; a sole component coupled to the upper; wherein internal surfaces of the sole component define a plurality of holes arranged in an auxetic configuration; wherein the auxetic configuration is configured such that when the sole component is compressed in a first direction, the sole component contracts in both the first direction and in a second direction orthogonal to the first direction; and wherein the internal surfaces define sides of the plurality of holes and are shaped as one-sheeted hyperboloids.

Clause 17. The article of footwear according to Clause 16, wherein the plurality of holes is arranged in rows extending along the first direction.

Clause 18. The article of footwear according to Clause 17, wherein at least two of the rows are parallel to each other, and the plurality of holes in said at least two of the rows are aligned with one another.

Clause 19. The article of footwear according to any of Clauses 17 and 18, wherein the plurality of holes in at least two adjacent ones of the rows are offset relative to each other.

Clause 20. The article of footwear according to any of Clauses 16-19, wherein: the sole component has a first surface, a second surface opposite the first surface, and the plurality of holes are between the first surface and the second surface; and the internal surfaces define a first end surface and a second end surface of each of the plurality of holes, the first end surface is closer to the first surface than to the second surface, the second end surface is closer to the second surface than to the first surface, each of the plurality of holes defines a central portion disposed between the first end surface and the second end surface, the plurality of holes includes a first hole and a second hole adjacent the first hole, and the first end surface of the second hole is closer to the central portion of the first hole than to the first end surface of the first hole.

Clause 21. The article of footwear according to any of Clauses 16-20, wherein the sole includes a sole material, and each of the plurality of holes is entirely surrounded by the sole material.

Clause 22. The article of footwear according to Clause 21, wherein the sole material includes foam.

Clause 23. The article of footwear according to any of Clauses 21 and 22, wherein, upon application of a compressive force on the sole component, the sole material collapses into the plurality of holes in a rotating motion.

Clause 24. The article of footwear of any of Clauses 21-23, wherein each of the plurality of holes defines a central axis, each of the plurality of holes is symmetrical about the central axis, and the sole material collapses into the plurality of holes by rotating about the central axis of each of the plurality of holes.

Clause 25. The article of footwear according any of Clauses 16-24, wherein the plurality of holes has different sizes.

Clause 26. The article of footwear according to any of Clauses 16-25, wherein the sole component includes a forefoot portion, a heel portion, and a midfoot portion disposed between the heel portion and the forefoot portion, and sizes of the plurality of holes at the heel portion are different from sizes of the plurality of holes at the forefoot portion.

Clause 27. The article of footwear according to Clause 26, wherein the sizes of the plurality of holes continuously decrease from the heel portion to the forefoot portion.

Clause 28. The article of footwear according to any of Clauses 16-27, wherein the plurality of holes includes a first hole and a second hole, and the first hole is obliquely angled relative to the second hole.

Clause 29. The article according to any of Clauses 16-28, wherein the plurality of holes includes a first group of holes and a second group of holes separated by a transition region, the transition region lacks holes, and the first group of holes and the second group of holes have different orientations.

Clause 30. The article according to any of Clauses 16-29, wherein the sole component includes a plurality of vertically stacked layers, and the plurality of holes in the vertically stacked layers have different orientations.

Clause 31. The article according to any of Clauses 16-30, wherein the sole component includes a plurality of vertically stacked layers, and the plurality of holes in the vertically stacked layers have different sizes.

Clause 32. A method of manufacturing an article, comprising: producing a base component such that the base component includes a foam matrix and a plurality of bodies embedded in the foam matrix, wherein at least some of the bodies are shaped as one-sheeted hyperboloids and include a water-soluble material; and immersing the base component in water to dissolve the plurality of bodies and define a plurality of holes disposed inside the base component.

Clause 33. The method according to Clause 32, wherein the water-soluble material includes polyacrylic acid.

Clause 34. The method according to Clause 32, wherein the bodies are coupled to each other and are part of a one-piece cellular structure.

Clause 35. The method according to any of Clauses 32-34, wherein said producing includes three-dimensional printing of the foam matrix.

Clause 36. A method of manufacturing an article, comprising: 3-D printing a base component such that the base component includes a foam and a plurality of holes disposed inside the foam, wherein internal surfaces of the base component defining at least some of the plurality of holes are shaped as one-sheeted hyperboloids.

Clause 37. A method of manufacturing an article, comprising: injecting a polymeric material into a cavity of a mold; inserting an injection molding tool into the cavity, wherein the injection molding tool includes a plurality of bodies, wherein each of the plurality of bodies has a surface shaped as a one-sheeted hyperboloid; and removing the injecting molding tool from the cavity.

Clause 38. The method of Clause 37, wherein the injection molding tool includes a support body and a plurality of rods coupled to the support body, and the each of the plurality of bodies is attached at an end of a respective one of the plurality of rods.

Clause 39. A method of manufacturing an article, comprising: placing foam on a die; and moving a ram toward the foam until the ram passes through the foam in order to extrude portions of the foam, wherein the ram includes a plurality of bodies, and each of the plurality of bodies has a surface shaped as a one-sheeted hyperboloid.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, unless stated otherwise, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending along a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending along a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

The above features and advantages, and other features and advantages, of the present teachings are readily apparent from the following detailed description of some of the best modes and other embodiments for carrying out the present teachings, as defined in the appended claims, when taken in connection with the accompanying drawings.

The invention claimed is:

1. An article comprising:
    a base component defining a plurality of holes arranged in an auxetic configuration;
    wherein the auxetic configuration is configured such that when the base component is compressed in a first direction, the base component contracts in both the first direction and in a second direction orthogonal to the first direction;
    wherein a surface of the base component defining at least one of the plurality of holes is shaped as a one-sheeted hyperboloid;
    wherein the base component includes a forefoot portion, a heel portion, and a midfoot portion disposed between the heel portion and the forefoot portion, and sizes of the plurality of holes continuously decrease from the heel portion to the forefoot portion; and
    a thickness of the base component continuously decreases from the heel portion to the forefoot portion.

2. The article according to claim 1, wherein surfaces of the base component at each of the plurality of holes are shaped as one-sheeted hyperboloids.

3. The article according to claim 1, wherein the plurality of holes is arranged in rows extending along the first direction.

4. The article according to claim 3, wherein at least two of the rows are parallel to each other, and the plurality of holes in said at least two of the rows are aligned with one another.

5. The article according to claim 3, wherein the plurality of holes in at least two adjacent ones of the rows are offset relative to each other.

6. The article according to claim 1, wherein:
    the article has a first surface, a second surface opposite the first surface, and the plurality of holes are between the first surface and the second surface; and
    at each of the plurality of holes, an internal surface of the base component defines a first end surface and a second end surface, the first end surface is closer to the first surface than to the second surface, the second end surface is closer to the second surface than to the first surface, each of the plurality of holes defines a central portion disposed between the first end surface and the second end surface, the plurality of holes includes a first hole and a second hole adjacent the first hole, and the first end surface at the second hole is closer to the central portion of the first hole than to the second end surface at the first hole.

7. The article according to claim 1, wherein the base component includes a base material, and each of the plurality of holes is entirely surrounded by the base material.

8. The article according to claim 7, wherein the base material includes foam.

9. The article according to claim 7, wherein, upon application of a compressive force on the base component, the base material collapses into the plurality of holes in a rotating motion.

10. The article according to claim 7, wherein surfaces of the base component at each of the plurality of holes are shaped as one-sheeted hyperboloids, each of the plurality of holes defines a central axis, each of the plurality of holes is symmetrical about the central axis, and the base material collapses into the plurality of holes by rotating about the central axis of each of the plurality of holes.

11. The article according to claim 1, wherein surfaces of the base component at each of the plurality of holes are shaped as one-sheeted hyperboloids, and the plurality of holes have different sizes.

12. The article according to claim 1, wherein the plurality of holes includes a first hole and a second hole, each of the first hole and the second hole is shaped as a one-sheeted hyperboloid, and the first hole is obliquely angled relative to the second hole.

13. The article according to claim 1, wherein the article is a sole component for an article of footwear.

14. An article of footwear, comprising:
an upper;
a sole component coupled to the upper;
wherein internal surfaces of the sole component define a plurality of holes arranged in an auxetic configuration;
wherein the auxetic configuration is configured such that when the sole component is compressed in a first direction, the sole component contracts in both the first direction and in a second direction orthogonal to the first direction;
wherein the internal surfaces define sides of the plurality of holes and are shaped as one-sheeted hyperboloids;
wherein the sole component includes a forefoot portion, a heel portion, and a midfoot portion disposed between the heel portion and the forefoot portion, and sizes of the plurality of holes continuously decrease from the heel portion to the forefoot portion; and
a thickness of the sole component continuously decreases from the heel portion to the forefoot portion.

15. The article of footwear according to claim 14, wherein the plurality of holes is arranged in rows extending along the first direction.

16. The article of footwear according to claim 15, wherein at least two of the rows are parallel to each other, and the plurality of holes in said at least two of the rows are aligned with one another.

17. The article of footwear according to claim 15, wherein the plurality of holes in at least two adjacent ones of the rows are offset relative to each other.

18. The article of footwear according to claim 14, wherein:
the sole component has a first surface, a second surface opposite the first surface, and the plurality of holes are between the first surface and the second surface; and
the internal surfaces define a first end surface and a second end surface of each of the plurality of holes, the first end surface is closer to the first surface than to the second surface, the second end surface is closer to the second surface than to the first surface, each of the plurality of holes defines a central portion disposed between the first end surface and the second end surface, the plurality of holes includes a first hole and a second hole adjacent the first hole, and the first end surface of the second hole is closer to the central portion of the first hole than to the first end surface of the first hole.

* * * * *